United States Patent Office 3,153,016
Patented Oct. 13, 1964

3,153,016
LINEAR POLYMERS CONTAINING PHOSPHORUS
Hobson D. De Witt, New Wilmington, Pa., assignor, by mesne assignments, to Monsanto Company, a corporation of Delaware
No Drawing. Filed May 17, 1961, Ser. No. 110,644
14 Claims. (Cl. 260—78)

This invention relates to the production of synthetic polymeric products and in particular to the production of linear polymeric products, the recurring molecular units of which contain phosphorus and nitrogen.

Various attempts have been made in the past to prepare polymeric materials containing phosphorus or phosphorus compounds in order to improve the heat stability and flame resistance of plastics and related materials. Unfortunately, however, it has been found that such polymeric materials have not been entirely suitable for various plastic applications and this is particularly so in the production of satisfactory filaments. That is to say, it has been difficult to produce phosphorus-containing polymers with improved heat stability and flame resistance which also posses such necessary properties as the ability to be incorporated into the melt or spinning solution of the polymer with no deleterious effect on the properties of resulting filaments.

It is an object of this invention to provide linear polymers derived from dihydroxamic acids and organo-phosphonic acids which can be formed into fibers, filaments, films, coatings and other useful materials.

It is another object of this invention to provide a method for the production of new polymers which can be oriented into fibers and filaments for particular use in the textile and related industry.

It is still another object of this invention to provide synthetic linear polymers containing in their recurring molecular groups both nitrogen and phosphorus, which polymers are both heat stable and flame resistant.

In general, the objects of this invention are attained by bringing together under reaction conditions the requisite amounts of a dihydroxamic acid and an organo-phosphonic acid or its corresponding halide or anhydride, and continuing the resulting reaction until a high molecular weight fiber-forming material is obtained. The reaction normally is carried out at room temperature and atmospheric pressure, although the reaction may be carried out at pressure above or below atmospheric pressure and at elevated temperatures.

The process of this invention and the resulting polymer may be illustrated by the following equation:

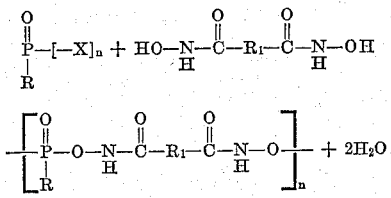

wherein R is a monovalent organic radical containing from 1 to 12 carbon atoms and free from reactive substituents, preferably an alkyl radical, X is selected from the group consisting of hydroxyl, oxygen and halogen, $R_1$ is a divalent organic radical free from reactive substituents, and $n$ is an integer of from 1 through 2, $n$ being 1 when X is oxygen and $n$ being 2 when X is selected from hydroxy and halogen. It is preferred that $R_1$ be a hydrocarbon radical selected from the group consisting of aryl, aralkyl, alkyl, and cylcoalkyl, having from 1 to 12 carbon atoms.

The dihydroxamic acids employed in the prepartion of the synthetic linear polymers of the invention may be represented by the general formula

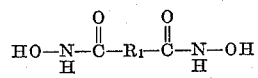

wherein $R_1$ is a divalent organic radical free from reactive substituents.

The dihydroxamic acids of this invention are produced by the well known reaction of the corresponding dicarboxylic acid esters, halides and amides with hydroxylamine.

Among the dihydroxamic acids suitable for preparing the novel polymers of the invention are the dihydroxamic acids prepared from the esters, acid halides, or amides of aliphatic dicarboxylic acids, such as malonic acid, succinic acid, glutaric acid, adipic acid, pimelic acid, suberic acid, azelaic acid and sebacic acid. Other dihydroxamic acids of the above formula may be used wherein $R_1$ is aryl, aralkyl, cycloalkyl. It is preferred that $R_1$ represent a hydrocarbon group having 1 to 12 carbon atoms.

In the present process, though it is possible to employ phosphonic acids or their anhydrides, it is preferred to employ the dihalide of the phosphonic acids. These dihalides are readily prepared by known procedures, for example by reacting the desired organo-phosphonic acids with thionylchloride or with phosphorous pentachloride at about 70° C. and in the presence of an inert solvent. The resulting derivative will have the same general formula as the phosphonic acid except that the hydroxyls will have been replaced by chloride radicals.

Among the organo-phosphonic acids, organo-phosphonic acid anhydrides or their dihalides which may be employed in the invention are methanephosphonyl dichloride, ethanephosphonyl dibromide, propanephosphonyl dichloride, isopropanephosphonyl diiodide, butanephosphonyl dichloride, 2-butanephosphonyl dichloride, heptanephosphonyl dichloride, decanephosphonyl dibromide, dodecanephosphonyl dichloride, benzenephosphonyl dichloride, p-toluenephosphonyl dichloride, benzylphosphonyl dichloride, cyclopentanephosphonyl dichloride, cyclohexanephosphonyl dichloride, methanephosphonic acid, ethanephosphonic acid, propanephosphonic acid, isopropanephosphonic acid, n-butanephosphonic acid, isobutanephosphonic acid, n-heptanephosphonic acid, decanephosphonic acid, dodecanephosphonic acid, benzenephosphonic acid, p-toluene phosponic acid, benzylphosphonic acid, cyclopentanephosphonic acid, cyclohexanephosphonic acid, ethanephosphonic anhydride, propanephosphonic anhydride, n-butanephosphonic anhydride and the like.

In general, the dihydroxamic acid is advantageously present in a molar amount substantially equal to the molar amount of organo-phosphonic acid, anhydride or acid halide employed. In some reactions it may be desired to produce a polymer of relatively low molecular weight, in which event, a slight excess of one or the other of the reactants may be employed. The polymerization may be conducted in the presence of a molecular weight regulator if necessary.

In producing the linear polymers of the present invention, additives that modify the polymers such as delusterants, plasticizers, pigments, colorants, and oxidation inhibitors may be incorporated in the polymer if desired.

The new polymers may be prepared by mass polymerization, or solution polymerization, preferably with the monomers in solution and employing stirring at a slightly elevated temperature. The polymerization may be conducted in batch lots, by continuous methods or by semi-continuous methods. In general, the process employed to prepare the linear polymers involves a polymerization reaction which includes suitable equipment for the removal of by-products of the reaction such as hydrochloric acid. Where a dihalide is employed an acid scavenger such as pyridine, triethylamine, dimethylaniline or other suitable compounds may be present or the hydrochloric acid may be allowed to evolve as a gas. Conveniently, the reaction may be carried out in the presence of a solvent which is inert to the reactants and the hydrochloric acid or other by-products liberated during the reaction and does not react with the reactants or resulting polymer under the conditions employed. Examples of suitable solvents are dimethylformamide, dimethylacetamide, dioxane, and other similar inert solvents.

While the invention includes the production of polymers of relatively low molecular weight that may be useful in the manufacture of coating compositions, lacquers, and the like, it is primarily concerned with the production of polymers which have film- and filament-forming properties. Filaments may be produced from the polymer by conventional melt spinning, i.e., by extruding a melt of the polymer through suitable orifices in a spinnerette into a cooling atmosphere. Filaments also may be produced by a conventional wet or dry spinning method from solutions of the polymer. If the polymer is of sufficiently high molecular weight, the filaments so formed may be drawn at comparatively low temperatures to filaments having good tenacity and elasticity.

In order to more fully and clearly elucidate the present invention the following example is presented. It is intended that this example be considered as illustrative rather than limitative.

*Example*

In a small flask there was dissolved 4.64 grams of sebacic dihydroxamic acid and 3.70 grams of triethylamine in dry dioxane. 3.90 grams of benzene-phosphonyl dichloride dissolved in dioxane was added thereto and the mixture stirred and warmed to 50° C. for 10 minutes. The resultant solid polymeric material was filtered, washed and dried. Fibers were obtained by wet spinning of the polymer.

When the above example is repeated with other defined dihydroxamic acids and organo-phosphonic acids, their anhydrides or their halides, similar results are obtained. For example, when azelaic dihydroxamic acid, suberic dihydroxamic acid, and the like are employed, polymers capable of being formed into fibers having useful textile properties are obtained. Likewise, useful polymers are obtained when benzenephosphonic acid, alkyl substituted benzenephosphonic acids, benzenephosphonic anhydride, n-propanephosphonic acid, n-propanephosphonic anhydride, n-butanephosphonic acid, butanephosphonyl dichloride, and the like are employed.

As many variations of this invention may be made without departing from the spirit and scope thereof it is intended that the invention be limited solely by the scope of the appended claims.

I claim:

1. A synthetic linear polymer consisting of the recurring structural unit

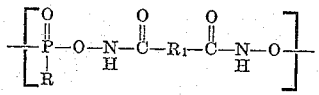

wherein R is a monovalent hydrocarbon radical containing from 1 to 12 carbon atoms and $R_1$ is a divalent hydrocarbon radical containing from 1 to 12 carbon atoms.

2. The polymer of claim 1 wherein R is an alkyl group and $R_1$ is an alkylene group.

3. The polymer of claim 1 wherein R is aryl and $R_1$ is alkylene.

4. The polymer of claim 1 wherein R is a cycloalkyl group and $R_1$ is an alkylene group.

5. The polymer of claim 1 wherein R is a cycloalkyl group and $R_1$ is an arylene group.

6. A polymer as defined in claim 1 wherein $R_1$ is a cycloalkylene group.

7. A process of producing a synthetic linear polymer comprising reacting together a mixture of an organo-phosphonic compound of the general formula

wherein R is a monovalent hydrocarbon radical free from reactive substituents, X is selected from the group consisting of hydroxyl, oxygen and halogen, and $n$ is an integer of from 1 through 2, $n$ being 1 when X is oxygen and $n$ being 2 when X is selected from hydroxyl and halogen, and a compound of the general formula

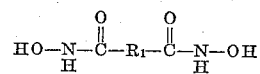

wherein $R_1$ is a divalent hydrocarbon radical containing from 1 to 12 carbon atoms, and continuing the reaction until a polymeric product is formed.

8. The process defined in claim 7 wherein R is phenyl, X is chloride and $R_1$ is octamethylene.

9. A process as defined in claim 7 wherein R is an aryl group.

10. A process as defined in claim 7 wherein R is a cycloalkyl group.

11. A process as defined in claim 7 wherein $R_1$ is an alkylene group.

12. A process as defined in claim 7 wherein $R_1$ is an arylene group.

13. A process as defined in claim 7 wherein $R_1$ is a cycloalkylene group.

14. A process of producing a synthetic linear organophosphorous polymer comprising reacting together a mixture of equimolar proportions of sebacic dihydroxamic acid and benzenephosphonyl dichloride.

References Cited in the file of this patent

UNITED STATES PATENTS 3,030,340 McConnell et al. _____ Apr. 17, 1962
3,043,810 Deichert et al. _____ July 10, 1962

OTHER REFERENCES

Organophosphorus Monomers and Polymers—Gefter, Assoc., Tech. Services, Inc., Glen Ridge, New Jersey, 1962, pages 212 and 223–227 relied on.